Jan. 8, 1935. A. L. SCHELLHAMMER 1,987,372
PIPE JOINT
Filed Nov. 3, 1931
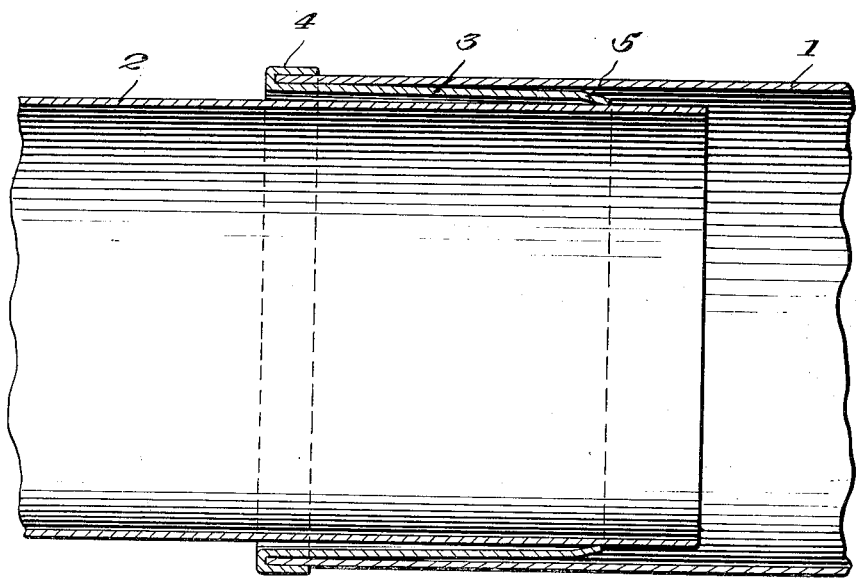
Inventor
ALFRED L. SCHELLHAMMER,
By Dyre + Kirchner
Attorneys.

Patented Jan. 8, 1935

1,987,372

UNITED STATES PATENT OFFICE 1,987,372

PIPE JOINT

Alfred L. Schellhammer, Warren, Pa.

Application November 3, 1931, Serial No. 572,843

6 Claims. (Cl. 285—185)

My invention relates to pipes and more particularly to means for connecting a pair of pipes together in a joint which will provide a substantially hermetical seal and be free of expansion noises when the pipes are heated.

The invention is especially adapted to embodiment in relatively large diameter sheet metal pipes used in stoves, furnace structures, flues, and similar installations where the pipes in use are required to transmit hot gases.

More particularly the invention is adapted to be used in connecting the fire pot or stove of a warm air furnace with a radiating drum, as shown in the copending application of Alfred L. Schellhammer, Christian S. Andersen and J. Donald Kroeker, Serial No. 571,616, filed October 28, 1931.

An object of the invention is to provide in means for connecting a pair of pipes in an installation of the class indicated, a joint which will seal the connected pipes against the escape of the hot gases transmitted thereby and will eliminate the objectionable "creeping" noises consequent upon expansion of the metal.

Prior to my present invention difficulty has been experienced in hot air stoves and flues in providing pipe joints for conducting the products of combustion or the heated air. Upon expansion of the pipe members during heating, and upon contraction during cooling, interfitting portions of the pipes move relatively to each other, and such relative movement, in joints of the prior art, sets up loud and consequently objectionable noises. The present invention provides means for interfitting the end portions of the pair of pipe elements which may be moved relatively to each other on expansion or contraction without such objectionable noises.

This important object of the invention is accomplished by providing a pair of pipe members the end portions of which are adapted to telescope to accommodate movements of the elements upon expansion or contraction, and by providing the end portion of one of the pipes with a sleeve or lining formed of a metal which is different from and preferably softer than the material of the pipes.

The invention is disclosed in one preferred form of embodiment on the accompanying drawing and in the following description, and is more particularly pointed out in the appended claims.

In the drawing which forms part of this application for Letters Patent, the figure represents a side elevational view of a pair of interfitting pipes partially broken away to show the joint connection in section.

Referring to the figure, reference numeral 1 designates the outer and larger of a pair of pipes, and 2 designates the inner and smaller pipe of the pair. It will be understood that the pipes 1 and 2 may be respectively permanently connected to the stove or fire pot and the radiator shown in the copending application above identified, or the pipes may be connected to any other elements of a stove, furnace or flue installation.

At the end portion of one of the pipe elements, preferably the larger pipe 1, I provide a lining member 3, having end portions 4 preferably crimped over the end of the pipe and a body portion 5 extending a short distance inwardly of the pipe and gradually tapered. The taper of the body portion 5 is such as to accommodate telescopically in a substantially hermetical seal the end portion of the pipe 2, and to permit of relative movement of the pipes 1 and 2 through a wide range consequent upon expansion or contraction of the parts, without materially impairing the tightness of the seal.

The pipes 1 and 2 are normally made of sheet metal of ferrous composition. In joints of the prior art, not provided with my novel sleeve or end lining 3, rubbing of the pipe surfaces in the joint due to expansion and contraction of the parts produces a series of loud "creeping" noises. I have found that such noises are entirely eliminated by forming the lining 3 of a metal which is different from, and preferably softer than, the ferrous metal of the pipe 2. Specifically I have found that a lining of aluminum or copper successfully and completely prevents the creeping noises and offers the required resistance to fusion and warping when subjected to the influence of heat.

It is to be understood that the essence of my invention resides in the provision of an end lining or sleeve for one of a pair of interfitting and relatively movable pipes, and in the discovery that the use of an end lining of a metal softer than that of the pipe telescopically engaged with it permits relative movement of the lining and the interfitting pipe without the production of objectionable noises.

In operation, the products of combustion or other hot gases, such as the air heated by the furnace, pass through the pipes 1 and 2 and are prevented from leaking therefrom by the snug fit of the end of the lining member 3 and the portion of the pipe 2 which it engages. When the pipes are heating or cooling, expansion or contraction of their metal and that of the elements to which their outer ends are secured causes the pipe 2 to slide along and in contact with the end of sleeve 3. The simultaneous expansion or contraction of the lining, together with its inherent resiliency, accommodates the penetration or withdrawal of the pipe 2 without binding and without impairing the efficiency of the seal. The difference in hardness and physical constitution of the material of the pipe 2 and the lining 3 permits tight sliding contact of these elements in silence.

It is to be understood furthermore that the invention has been shown and described merely for purposes of exemplification in one preferred form of embodiment. The invention is capable of embodiment in other and further modified forms and all such modifications, to the extent that they embody the principle of the invention as pointed out in the appended claims are to be deemed within the scope and purview thereof.

I claim:

1. In a conduit which in use is subjected to considerable variations of temperature, a pair of aligned pipe sections formed of relatively hard metal, and means for connecting the ends of said sections comprising a sleeve of softer metal connected to one of the sections and slidably engaged with the other section, said connection acting to eliminate noises normally incident to expansion and contraction.

2. In a conduit which in use is subjected to considerable variations of temperature, a pair of telescopically associated lengths of pipe formed of relatively hard metal, and a connecting member of softer metal interposed between the associated parts of said lengths, said connecting member acting to eliminate noises normally incident to expansion and contraction.

3. The conduit claimed in claim 1, in which the pipe sections are made of ferrous metal and the connecting member is made of metal selected from the group consisting of copper and aluminum.

4. The conduit claimed in claim 1, in which the pipe sections are made of ferrous metal and the connecting member is made of copper.

5. The conduit claimed in claim 1, in which the pipe sections are made of ferrous metal and the connecting member is made of aluminum.

6. In a conduit which in use is subjected to considerable variations of temperature, a pair of pipe sections formed of relatively hard metal having their end portions interfitted and telescopically movable, and a sleeve of softer metal interposed between the end portions hermetically secured at one end to an end of one of the pipe sections and having its other end hermetically slidably engaged with the end portion of the other pipe section.

ALFRED L. SCHELLHAMMER.